United States Patent
Knippel et al.

(10) Patent No.: US 6,801,990 B2
(45) Date of Patent: Oct. 5, 2004

(54) DEMAND-BASED MEMORY-BLOCK SPLITTING

(75) Inventors: Ross C. Knippel, Half Moon Bay, CA (US); Steven K. Heller, Acton, MA (US); David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 418 days.

(21) Appl. No.: 10/055,168

(22) Filed: Oct. 29, 2001

(65) Prior Publication Data

US 2003/0084266 A1 May 1, 2003

(51) Int. Cl.[7] .............................................. G06F 12/00
(52) U.S. Cl. ....................... 711/170; 711/159; 711/173; 707/206
(58) Field of Search ................................ 711/170, 171, 711/173, 153, 159; 707/205, 206

(56) References Cited

U.S. PATENT DOCUMENTS 5,978,893 A * 11/1999 Bakshi et al. ............... 711/171
6,490,670 B1 * 12/2002 Collins et al. .............. 711/173

OTHER PUBLICATIONS

Paul R. Wilson et al., Dynamic Storage Allocation: A Survey and Critical Review, Department of Computer Science, University of Texas at Austin, USA. pp. 1–78.

B. H. Margolin et al., Analysis of Free–Storage Algorithms, Free–Storage Algorithms, No. 4, pp. 283–304, 1971.

Dirk Grunwald et al., CustoMalloc: Efficient Synthesized Memory Allocators, Department of Computer Science, University of Colorado at Boulder, Technical Report CU–CS–602–92, pp. 1–22, 1992.

* cited by examiner

Primary Examiner—Pierre M. Vital
(74) Attorney, Agent, or Firm—Foley Hoag LLP

(57) ABSTRACT

A computer system (10) implements a memory allocator that employs a data structure (FIG. 3) to maintain an inventory of dynamically allocated memory available to receive new data. It receives from one or more programs requests that it allocate memory from a dynamically allocable memory "heap." It responds to such requests by performing the requested allocation and removing the thus-allocated memory block from the inventory. Conversely, it adds to the inventory memory blocks that the supported program or programs request be freed. In the process, it monitors the frequencies with which memory blocks of various sizes are allocated, and it projects from those frequencies future demand for memory blocks of those sizes. To split a relatively large block in order to meet an actual or expected request for a smaller block, it bases its selection of the larger block to be split on whether the supply of free blocks of the larger block's size is great enough to meet the expected demand for such blocks. Splitting occurs both preemptively, i.e., before a request for the result of the splitting, and reactively, i.e., in response to a previously made request for a block that will result from the splitting operation.

42 Claims, 5 Drawing Sheets

DEMAND-BASED MEMORY-BLOCK SPLITTING

BACKGROUND OF THE INVENTION

1. Field of the Invention

The present invention concerns computer-memory allocators and in particular mechanisms that they employ for splitting memory blocks.

2. Background Information

Some of the instructions that a processor reads from its memory direct it to read data stored in other memory locations. The program as loaded often specifies the locations in which the data are to be stored: memory is allocated statically. But many programs generate large quantities of intermediate results that require only temporary storage. To use memory efficiently, memory should not be allocated to such results unless and until they are actually produced: it should be allocated dynamically. And, once the program no longer needs the data for which space was thus allocated, the program should be allowed to reuse that memory space.

For this reason, most large programs employ a "heap" of dynamically allocable memory. As the program proceeds, various previously free memory blocks within the heap contain needed data, while other memory blocks become free for reuse because they contain data that are no longer needed. To keep track, the computer system usually maintains an inventory of locations and sizes of "free" memory blocks, i.e., of memory blocks that can receive new results.

Now, computer programs typically deal with data as various-sized "objects," each of which usually has all of its data stored in contiguous memory locations. So a block of (contiguous) memory locations must be found when the time comes to allocate memory dynamically to an object. An allocator is the system component that handles the task of keeping track of such free memory blocks and determining which of the free memory blocks are to be used to store new data.

Allocators occur at various levels in the software hierarchy. An operating system itself generates data for which it must dynamically allocate memory, so one of an operating system's tasks is to act as an allocator for that purpose. The operating system typically also serves as an allocator in response to various system calls made by applications programs. The C library function malloc( ), for instance, is a system call that an application uses to ask the system to allocate memory to the application. The free( ) library function conversely tells the system that the calling process no longer needs the data contained by the memory block that the call identifies.

Additionally, some applications that have called upon the operating system to allocate them memory will in turn act as allocators in "sub-allocating" that memory. An example of such an application is the Java Virtual Machine ("JVM"). (Java is a trademark or registered trademark of Sun Microsystems, Inc., in the United States and other countries.) Such an application calls upon the operating system to allocate it memory for its private heap, which it sub-allocates to objects created by the virtual-machine-language programs that it executes. The input to the JVM is one or more "class files," which include virtual-machine programs, i.e., sequences of the virtual machine's instructions. Included in the virtual machine's instruction set are instructions for allocating new objects, and the virtual machine can so operate as to allocate object memory by removing blocks from the free-block inventory. The JVM not only executes the class file's explicit instructions but also performs automatic "garbage collection": it identifies objects that the virtual-machine program will no longer use. The JVM may add such objects' memory space to the free-block inventory after they are thus identified.

Independently of the software-hierarchy level at which an allocator operates, one function that it must perform is "splitting." When a program frees a memory block of a relatively large size, the allocator may initially place it in its free-block inventory as a single block. Or, when the program frees several contiguous small memory blocks, the allocator may "coalesce" those entries into a single large block. (Workers in this field treat coalesce as a transitive verb.) In either case, the allocator may subsequently split that block into smaller blocks if a program thereafter requests allocation of a smaller block and no block of the requested size is available.

Performing such splitting is desirable because it conserves memory resources; allocating a large block in response to a request for a small one wastes memory space. But it can also detract from program performance; in a program that frequently allocates memory dynamically, the cost of splitting can become significant.

SUMMARY OF THE INVENTION

We have developed an approach to splitting that can reduce splitting cost. In accordance with the invention, we derive a demand indicator for each of a plurality of memory-block size ranges. Preferably, this is done by monitoring at run time the allocations of memory blocks whose sizes fall within the respective ranges, although demand derivation can instead be performed by static (compile-time) analysis or by profiling a previous execution of the program. One way to use the demand indicators is to compare the demand signified by the demand indicator for a given block size with the supply of blocks of that size. Typically, if the supply of blocks of a given size exceeds a demand projected for blocks of that size, then blocks of that size will tend to be selected for splitting, whereas blocks whose sizes not in adequate supply will tend not to be selected. This tends to reduce the likelihood that splitting performed at one time will necessitate further splitting or coalescing at a later time.

BRIEF DESCRIPTION OF THE DRAWINGS

The invention description below refers to the accompanying drawings, of which:

FIG. 4 a flow chart that illustrates how splitting decisions are made by one embodiment of the present invention; and.

DETAILED DESCRIPTION OF AN ILLUSTRATIVE EMBODIMENT

Figure 1:
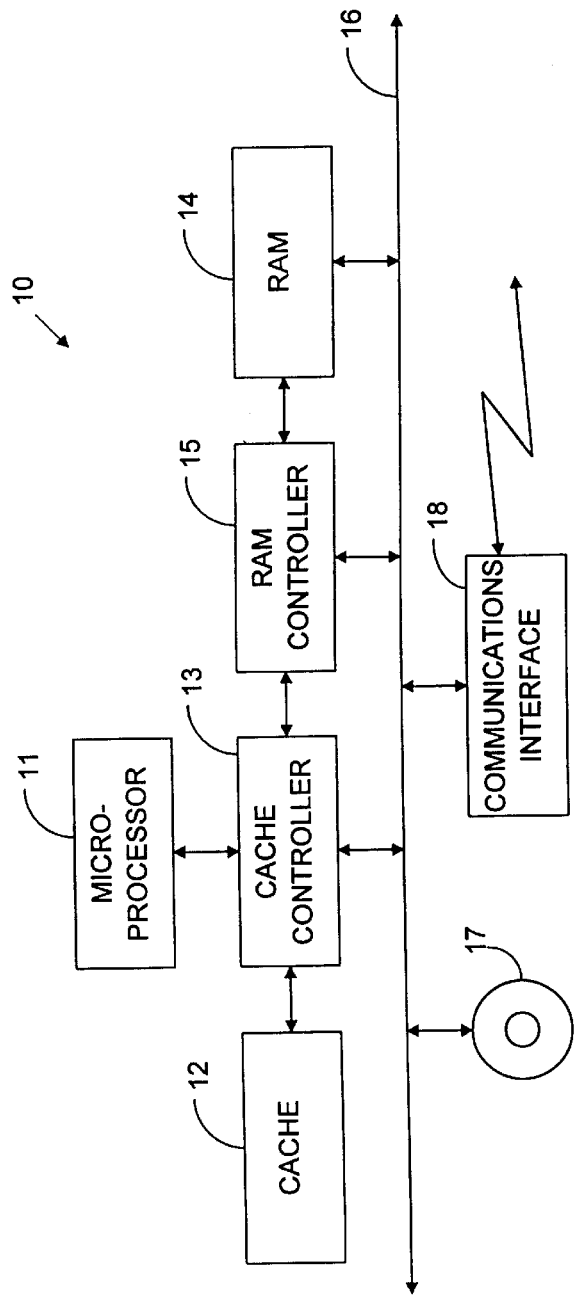
FIG. 1 is a block diagram of one type of computer system in which the present invention's teachings can be practiced.

The splitting operations to which the present invention is directed can be implemented in essentially all types of computer systems, but FIG. 1 depicts one type of computer system for the sake of concreteness. It is a uniprocessor system 10 that employs a single microprocessor 11. In FIG. 1's exemplary system, microprocessor 11 receives data and instructions for operating on them from on-board cache memory or further cache memory 12, possibly through the mediation of a cache controller 13. The cache controller 13 can in turn receive such data from system read/write memory ("RAM") 14 through a RAM controller 15 or from various peripheral devices through a system bus 16.

The RAM 14's data and instruction contents, which can configure the system to implement the teachings to be described below, will ordinarily have been loaded from peripheral devices such as a system disk 17. Other sources include communications interface 18, which can receive instructions and data from other computer equipment.

It will be mentioned below that some of the allocator's operations may be performed in the "background," typically in an execution thread separate from the thread or threads that carry out a program's more-central operations. Such parallel execution threads can be run on a uniprocessor, but some of the benefits of multi-threaded operation are more manifest in multiprocessor computer systems.

Figure 2:
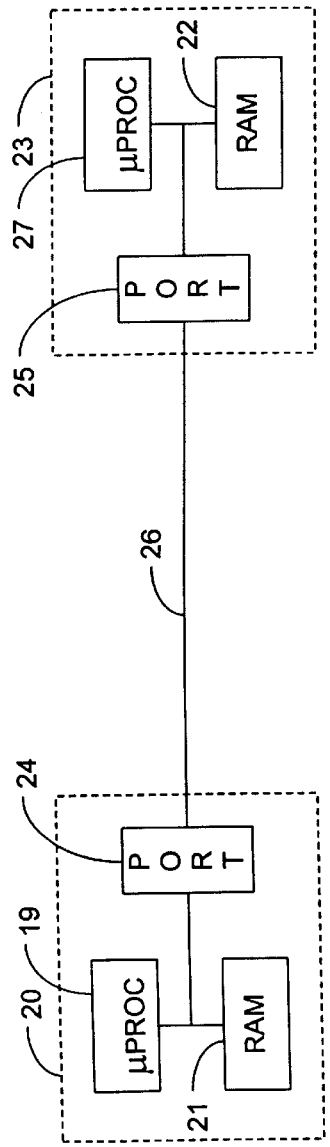
FIG. 2 is a block diagram of another type of computer system in which the present invention's teachings can be practiced.

Some multiprocessors may be largely the same as that of FIG. 1 with the exception that they include several microprocessors such as processor 11, possibly together with respective cache memories, sharing common read/write memory by communication over the common bus 16. In other configurations, parts of the shared memory may be more local to one or more processors than to others. In FIG. 2, for instance, one or more microprocessors 19 at a location 20 may have access both to a local memory module 21 and to a further, remote memory module 22, which is provided at a remote location 23. Because of the greater distance, though, port circuitry 24 and 25 may be necessary to communicate at the lower speed to which an intervening channel 26 is limited. A processor 27 at the remote location may similarly have different-speed access to both memory modules 21 and 22. In such a situation, one or the other or both of the processors may need to fetch code or data or both from a remote location, but it will often be true that parts of the code will be replicated in both places. Regardless of the configuration, different processors can operate on the same code, although that code may be replicated in different physical memory, so different processors can be used to execute different threads of the same process.

The computer systems of FIGS. 1 and 2 are but two of the many types of computer systems in which the present invention's teachings may be implemented. Regardless of its particular type, a computer system is configured to implement an allocator by computer code typically stored on a persistent machine-readable medium, such as FIG. 1's system disk 17, and the code is loaded into RAM 15 for that purpose by electrical-signal transmission. But the code's persistent storage may instead be provided in a server system remote from the machine or machines that implement the allocator. The electrical signals that carry the digital data by which the computer systems exchange the code are exemplary forms of carrier waves transporting the information.

A computer system that employs the present invention's teachings will keep a "heap" of memory from which blocks can be allocated dynamically, and the allocator will in some fashion keep track of those blocks. One way to do so is simply to employ a linked list, typically in size or address order, of the blocks that are free for allocation; since the blocks are free, their contents can include pointers to subsequent blocks in the list.

Figure 3:
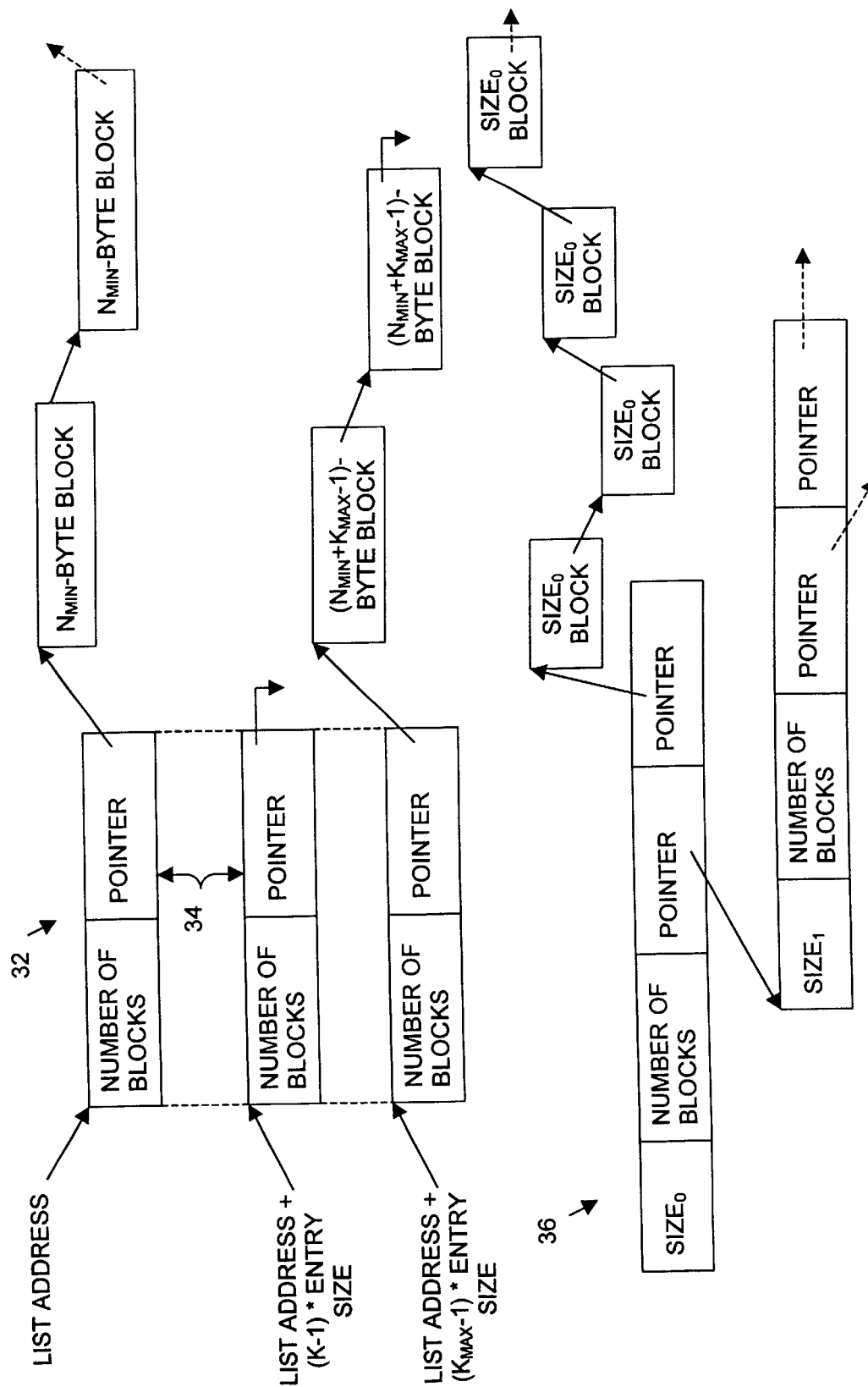
FIG. 3 is a block diagram that illustrates a type of free-block-inventory data structure that can be employed in practicing the present invention.

Preferably, the allocator will keep track of at least some of the free blocks in accordance with their sizes. The particular manner in which it does so is not critical. For the sake of concreteness, though, FIG. 3 depicts an example free-block-inventory data structure that can be used for this purpose. In this example, that data structure includes an array 32 of entries that include pointers 34 to respective linked lists of free blocks. The members of each such "free list" are blocks whose sizes fall within a range to which the respective entry corresponds. For the sake of simplicity, each range in the illustrated embodiment consists of a single memory-block size, and the size associated with each entry differs from the size associated with the previous entry by the alignment interval that the system imposes on dynamic-memory blocks. This may, for instance, be two computer words, i.e., eight bytes if the allocator is being run in a thirty-two-bit system.

Also for the sake of example, the array 32 is depicted as containing a respective pointer to a list for every possible block size up to some value $K_{MAX}$ of sizes. Since there is an entry for every possible size up to that represented by the $K_{MAX}$th entry, some entries may point to empty lists. For any size larger than the one that the $K_{MAX}$th entry represents, there are only non-empty lists. The inventory data structure includes a linked list 36 of entries that point to such further linked lists.

As will be explained below, the allocator will come to regard some lists as including enough blocks and others as including too few. It may be convenient to segregate the two types of lists instead of having all belong to a common "list of lists," as FIG. 3 suggests. Some embodiments may therefore maintain such a segregation, at least in the case of the large-block lists, for which doing so is particularly convenient.

Each array entry may include fields in addition to the pointer field. For the sake of example, the drawing shows one such field, a "number of blocks" field, which contains a value representing the associated linked list's length. As the pointer-representing arrows extending from the various free blocks suggest by example, the free blocks themselves contain other data that support the list organization.

When a block becomes free, it is added to the list, possibly by being placed at the head of the list but more typically by being so placed as to maintain the linked list's address order. When a block of a given size is to be allocated, it is removed from the list for the corresponding size, typically by being taken from the front of the list.

We digress at this point to note that, although an allocator may use a data structure such as FIG. 3's to help it maintain its free-block inventory, such a data structure will not necessarily list the allocator's entire inventory: it will not necessarily list all the memory blocks that the allocator considers available for allocation. As will become apparent, parent, the illustrated embodiment may occasionally allocate or split a block that it considers available for allocation— i.e., a block that is by definition on its free-block inventory—without ever having placed the block in the free-block-inventory data structure. So the allocator can in reality add or remove memory blocks from its inventory without affecting that data structure.

As was mentioned above, allocation, freeing, and free-block-inventory maintenance can occur at various levels in the software hierarchy. As was also mentioned above, an application may itself maintain a dynamically allocable heap and therefore keep its own free-block inventory. Different inventories may therefore be maintained concurrently for different software levels. The operating system, for instance, may maintain an inventory of physical memory that it can allocate to all processes and also keep respective different inventories of its different processes' virtual memory. An application may keep an inventory of its own in support of its "sub-allocation" of (typically virtual memory that the operating system has allocated to it.

Use of the present invention's allocation techniques at a given software level may be limited to management of only part of the dynamically allocable memory. It often occurs, for instance, that a garbage-collected system divides the heap that its garbage collector manages into "generations," of which there are usually two, although there may be more (or only one). Newly allocated objects are usually placed in a "young generation." The collector typically collects this generation frequently, since objects tend to have high "infant mortality": recently allocated objects tend to become garbage rapidly, while objects that have "survived" for a long time tend to keep surviving. The (again, typically only one) older generation, which contains long-lived objects, is typically collected much less often. Although the present invention's techniques can be used for all generations, some of the present invention's embodiments may employ them only for, say, the old generation. In such a case, nearly all the allocations that result in memory-block removal from the free-block inventory would be those that occur when an object is "promoted" from the young generation to the old one and therefore relocated from the former's space to the latter's. So the term heap in the discussion below will be understood to refer sometimes to only a single generation within a garbage-collected heap.

It is apparent from the discussion so far that allocation can occur in a wide range of environments. The present invention's teachings, which deal with splitting, are applicable independently of what the environment is. The invention tends to reduce the overall expense of splitting. It does this by basing splitting decisions on some type of demand indicator. Preferably, the demand indicator used for splitting decisions made during a given program execution is derived from run-time demand monitoring, i.e., on monitoring performed during the same execution to assess the program's demand for dynamic allocation. While the examples given below employ run-time monitoring, though, demand indicators can instead be derived from profiling a previous execution of the same program or from static (compile-time) analysis.

Examples of how monitored demand may be employed in making such decisions will be given below. Basically, the allocator observes how often memory blocks of a certain size have been allocated over some previous period, projects from this information how many such blocks will likely be allocated during some future period, and bases its decision about whether to split a memory block of the given size on, say, whether there are already enough blocks of the given size to meet the projected demand.

Figure 4:
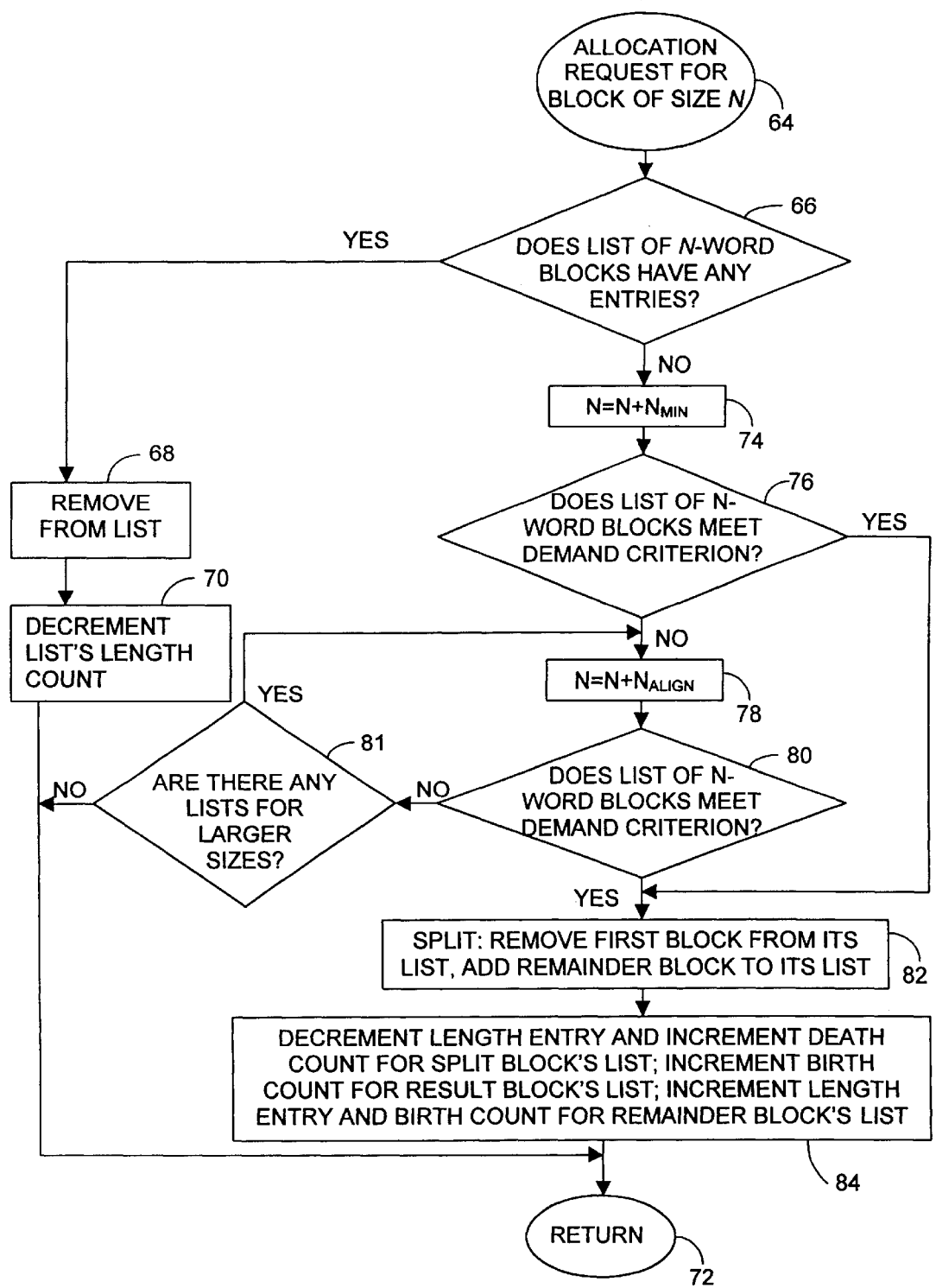

FIG. 4 is a simplified flow chart of the approach that the illustrated embodiment takes to making such decisions. FIG. 4's block 64 represents a request that a memory block be allocated. Such requests commonly occur when programs written in the C programming language call the malloc( ) routine. Another example of an allocation occasion occurs in a generational garbage collector, when an object is "promoted" from the young generation to the old generation and is therefore to be moved into the older generation's space: a block in the old generation must be allocated to the object being promoted.

A request that a given-sized memory block be allocated causes the allocator first to consult the free list associated with that size. If the list contains any blocks, then one is removed from the list, as blocks 66 and 68 indicate. The allocator also updates various values that will be needed for monitoring demand. In the illustrated embodiment, the only such value in this instance is the one that represents the length of the list from which the block has just been removed. That value is decremented, as FIG. 4's block 70 indicates. Then, as block 72 indicates, the allocator returns, passing a pointer that gives the removed block's location.

In the scenario just described, no splitting was required, because a block of the required size already existed. If the test of block 66 indicates that no such block exists, though, the allocator proceeds to inspect lists of larger blocks, which can be split to make a block of the desired size. Now, overhead or other requirements dictate that most allocators impose a minimum memory-block size on their dynamically allocable memory. It is therefore preferable that the size of the block that remains once the desired-size block has been split from a larger block be at least this minimum size. So the illustrated embodiment looks first to the list associated with the size that exceeds the desired size by that minimum. Block 74 represents thus increasing the size for which the allocator looks.

The allocator then determines whether the free-block list associated with that size contains more than enough blocks to meet the expected demand. Again, the demand criterion applied at this point may additionally depend on other factors such as location, etc., but we will refer to it here simply as a demand criterion. If that list does not have more than enough blocks to meet the expected demand, the allocator looks to a list for the next-larger size, increasing the size value this time by the system's alignment increment, as blocks 76 and 78 indicate. As blocks 78, 80 and 81 indicate, the allocator evaluates the demand criterion for lists of increasingly large blocks until there are no longer blocks or a list is found that contains more than enough blocks to meet the expected demand.

For the sake of simplicity, FIG. 4 focuses on demand-based splitting and depicts the splitting routine as returning without splitting if the block-81 determination is that there are no larger blocks. In most embodiments, though, such a failure to find a splitting opportunity will result in the allocator's repeating the search for a splitting opportunity, this time imposing a different demand criterion, or, more typically, none at all.

We digress at this point to observe that the diagrams of FIG. 4 and other drawings describe sample routines with an eye toward ease of understanding and that most workers who implement the present invention's teachings will adopt more-elaborate routines in order to provide features that optimize the routine's performance in one way or another. An example in this regard is a "hint" mechanism, which an allocator may use to expedite the task of finding an over-supplied size large enough to yield the given size by splitting. When an allocator using such a mechanism finds such a larger size, it records that larger size against the given size. Then, when the allocator again needs to perform splitting to produce a block of the given size, it will start its search at the larger size last recorded against the given size. That is, it would not necessarily start at $N+N_{MIN}$, as block 74 indicates.

Independently of how the allocator finds a list having an oversupply, though, it produces a block of the desired size by performing a splitting operation when it does. As FIG. 4's block 82 indicates, that is, it removes the large block from its list, typically writes appropriate values into two of the large block's constituent parts so as to create a requested-size block and a remainder block, and adds the remainder block to the list associated with the remainder block's size.

When such splitting occurs, the allocator will in most embodiments need to update various values that it uses for the demand-monitoring process, as block 84 indicates. In the illustrated embodiment, such updating includes decrementing the length entry for the split block's list and incrementing its death count. For the sake of simplicity, we have assumed that the newly created block of the desired size is not placed into the list representing senting blocks of that size, but the birth count associated with that size should nonetheless be incremented. For the list associated with the remainder block's size, the length entry needs to be incremented to reflect the remainder's addition to the list, and its birth count should be incremented to indicate that the increase resulted from splitting or coalescing rather than from an erstwhile-allocated block's being freed. Then, as block 72 indicates, a pointer to the requested block is returned.

The diagram of FIG. 4 is based on the assumption that splitting occurs reactively, i.e., only in response to a previous request that a block of an otherwise unavailable size be allocated. In some embodiments, though, splitting may occur preemptively, i.e., before, or at least independently of, the specific request that the split will supply.

Figure 5A:
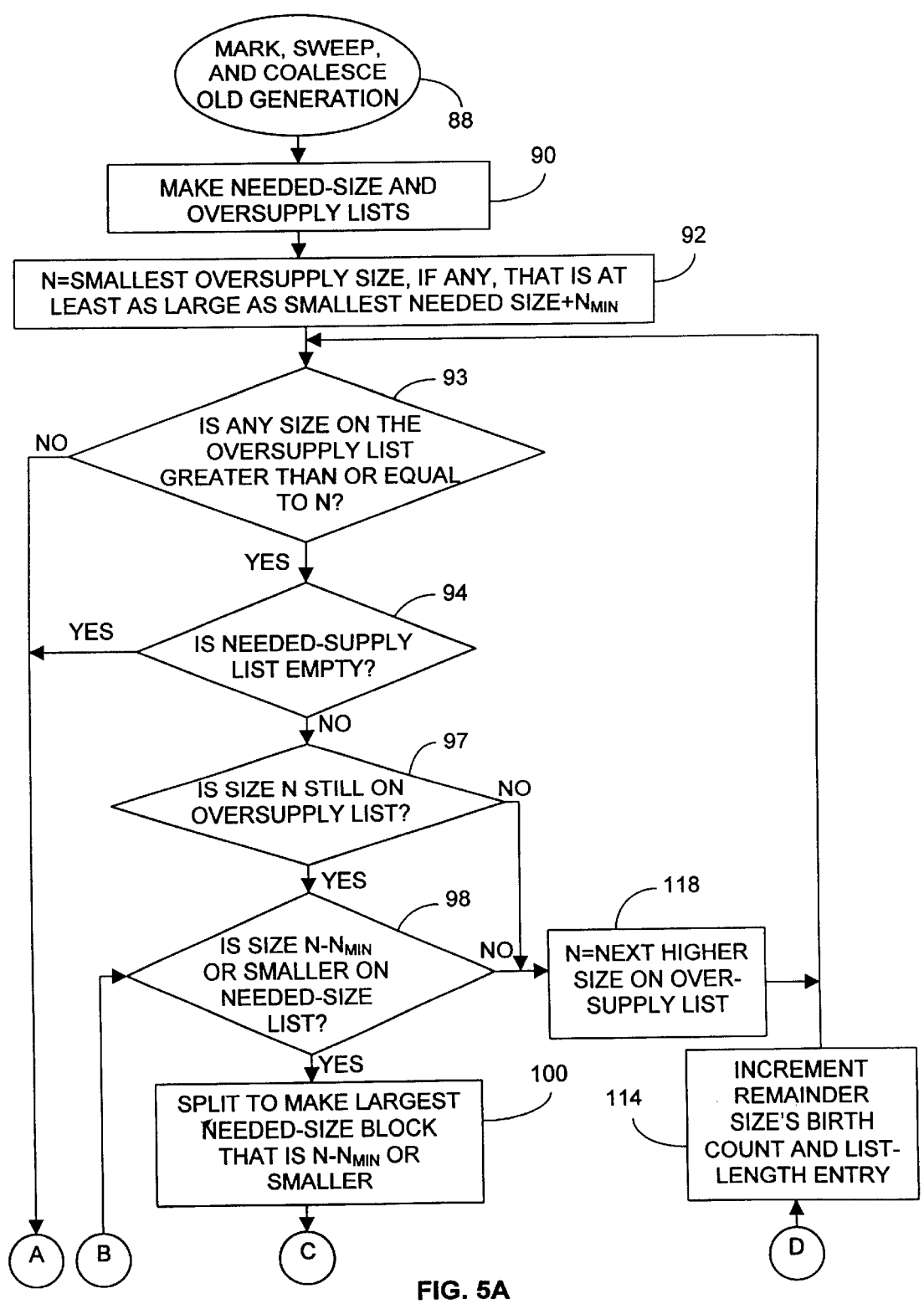
FIGS. 5A and 5B together form a flow chart that illustrates how splitting decisions are made in accordance by another embodiment of the present invention.
Figure 5B:
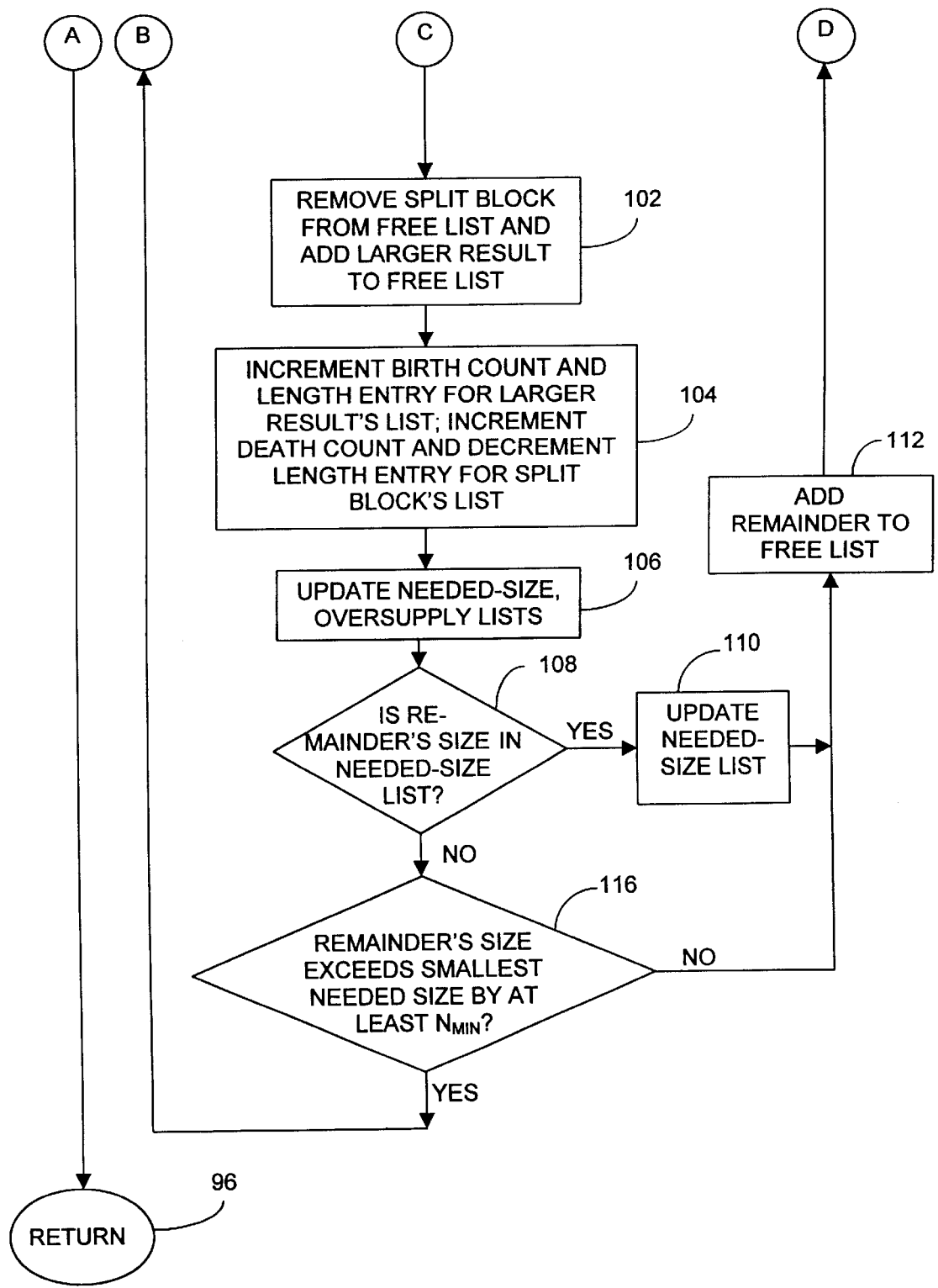

As an example of preemptive splitting, FIGS. 5A and 5B (together, "FIG. 5") depict a preemptive-splitting routine that, as will be typical, bases its splitting decisions on demand measured and projected over some period. For the sake of concreteness, let us assume that the preemptive splitting is performed in the context of a system that collects garbage automatically in cycles. Although any period can be selected as the period over which demand is measured, such cycles define natural periods for this purpose. For instance, the interval chosen for demand monitoring and projection may be a "major" garbage-collection cycle. As was mentioned above, some garbage collectors collect by generations, typically collecting a single young generation and a single old generation. Such collectors typically collect the entire young generation relatively often, so a "minor," young-generation collection cycle is relatively short, while a "major" cycle, required for full collection of the old generation, is much longer. Again for the sake of concreteness, we will assume that the FIG. 5 routine is used for splitting in the old generation and that demand is measured and projected over intervals between major cycles.

To assess the demand for memory blocks of a given size, the allocator may subtract the number of such blocks free at the start of one major cycle from the corresponding number at the end of the previous major cycle. To make the result more accurate, it is preferable respectively to add to and subtract from that difference the number of "births" and "deaths" of the given-sized memory blocks that resulted from coalescing and splitting during the interval.

In many garbage-collected systems, opportunities for preemptive splitting can result most frequently from a methodical sweeping operation in which the collector proceeds linearly through one of the heap's generations, identifying memory blocks that a previous marking operation did not mark as reachable, and placing them in free lists. Resultants runs of contiguous free blocks may be coalesced in the process. (All such runs may be coalesced, or the coalescing may be selective, based, for instance, on its own demand criterion.) Preemptive splitting can be performed more or less continually, as memory blocks whose sizes are in oversupply are created by preemptive coalescing or freed. As soon as an object of a given size is freed, for instance, a determination of whether memory blocks of its size are in oversupply can be made immediately, and splitting can be performed on the basis of that decision alone. In the alternative, the splitting decision can be performed on the resultant block each time a preemptive coalescing operation occurs. If the memory block that results from the coalescing is of a size that is in oversupply, for example, a determination can be made of whether any smaller sizes are in undersupply, and the block can be split if there is any such undersupply.

For the FIG. 5 routine, though, we will assume that such marking, sweeping, and coalescing of the complete old generation, which occur once each major cycle, are all completed before the preemptive splitting starts. Block 88 represents these pre-splitting operations. The pre-splitting operations are typically performed in the background, concurrently with execution of the "mutator," i.e., of the program portion that produces the garbage that the program's garbage-collector portion collects. The splitting operations that will now be described typically are, too.

As will be explained below, many refinements of the demand measurement described above can be used. To avoid obscuring the present invention's principles with unnecessary complexity, though, the FIG. 5 example simply uses a uniform demand criterion that does not change during a given execution of the routine. In such an approach (and some others) it may be convenient initially to proceed through the lists to compile a list of sizes that are in oversupply and a list of sizes that are in undersupply. Block 90 represents making such lists. To decide whether a given size needs more blocks, the illustrated embodiment determines whether its list already has enough members to meet a demand criterion. In the case of the FIG. 5 routine, we will assume that the criterion is simply that the number of blocks in the list exceed the projected demand or exceed some predetermined percentage or some other function of that projected demand.

The allocator then finds the smallest size on the list of sizes of which there is an inadequate supply, and it consults the other, oversupply list to determine whether any sizes on that list exceed the smallest undersupplied size by at least the minimum block size, as FIG. 5's blocks 92 and 93 indicate. If there is no such oversupplied-size block that can be split into an undersupplied size—possibly because there is no undersupplied size left—the preemptive splitting is over, as FIG. 5's blocks 93, 94, and 96 (FIG. 5B) indicate. Otherwise, the allocator proceeds to split the memory block after performing the steps of blocks 97 and 98, which are required for subsequent passes through the loop.

There is often more than one way of usefully splitting the memory block. As FIG. 5's block 100 indicates, though, the particular approach employed by the illustrated embodiment is to split the block in such a way as to produce a block of the largest needed size that will leave a remainder of at least the minimum size.

The particular mechanics of the splitting operation will depend on the heap and inventory-data-structure formats to which a particular embodiment of the invention is applied Ordinarily, memory blocks employed for dynamic allocation include self-identification "overhead" fields. So the splitting operation will normally include reformatting the previously single memory block as two memory blocks having respective size and allocation-status fields, but FIG. 5 does not separately represent that particular part of the splitting operation. FIG. 5 does include blocks 102, 104 and 106, which separately represent other splitting-operation tasks. Since the split memory block should no longer be included in the list associated with its pre-split size, block 102 represents removing it from that free list. Also, the split results now belong to the free-block inventory. In the illustrated embodiment, though, only the larger of the resultant blocks is added to a free list initially, as block 102 also indicates. (If both resultant blocks are of the same size, only one is initially placed on that list.) The other block is considered a remainder, which may itself be subject to splitting, as will be discussed presently.

FIG. 5's block 104 represents updating birth and death counts, since the illustrated embodiment uses those values for demand monitoring. As was mentioned above, the illustrated embodiment maintains lists of needed sizes and of sizes in oversupply, and the split block's removal from its free list and the resultant block's addition to its may result in changes to those lists, so block 106 represents updating them.

Block 108 represents determining whether the space remaining in the split block is of a size that is needed. If so, the allocator installs it as a free block of that size. Typically, this includes so formatting it, but FIG. 5 does not show that explicitly. FIG. 5's blocks 110, 112, and 114 do explicitly represent adding it to a free list and making appropriate updates to support demand monitoring and further splitting. The allocator then proceeds to the operation represented by block 93 to continue the splitting process on further memory blocks.

If the block-108 step's determination is that the remainder's size is not needed, on the other hand, the allocator splits the remainder further if a test represented by block 116 indicates that the remainder can be so split as to yield a needed-size block and leave a block of at least the minimum-block size. Otherwise, the remainder block is added to a free list even though the supply of its size is adequate.

Blocks of the oversupplied size currently under consideration keep being split in the manner described so far until the test of block 97 or 98 indicates that memory blocks of that size are no longer oversupplied or cannot be split into needed-size blocks. As block 118 indicates, the allocator then turns to the next size that is in oversupply, and the process proceeds. This continues until the step of block 93 or 94 indicates that no more oversupply-sized blocks can be split into needed-sized blocks.

The preemptive splitting may not result in enough memory blocks of all sizes to meet the projected demand. True, enough larger blocks should be in oversupply in a well-designed program running on an adequate-memory-capacity computer system to meet all projected demands by splitting. But actual requests may nonetheless outstrip the supply that preemptive splitting produces. This can result either because the actual demand exceeds the projected demand or because the splitting operation is being performed in the background and has not produced the needed blocks in time. So allocators that perform preemptive splitting typically will also perform some reactive splitting, i.e., splitting in which a splitting operation is triggered by an allocation request that is satisfied by one or more of the splitting operation's results.

Demand-based splitting can be practiced in ways that differ in many respects from those that FIGS. 4 and 5 illustrate. For example, some embodiments may employ the demand criterion only in some circumstances, not in all of them. An allocator may depart from a demand criterion in certain circumstances in order to, say, include a bias toward especially large-sized blocks. Such an allocator may avoid preemptively splitting any block larger than a predetermined large size, for example, independently of whether the block is in oversupply.

Additionally, the major-cycle period assumed above as the period on which demand monitoring and projection are based is not the only period appropriate in embodiments of the present invention that employ demand-based splitting criteria. Indeed, such a period is not even available in systems that do not collect garbage in cycles. We assumed major-cycle-based monitoring and projection in connection with FIG. 5 because the allocator was assumed to deal with the older generation in a two-generation garbage-collected system, and most of the free-block-inventory replenishment for that generation may occur as a result of sweep operations performed once each major cycle. In such a context, projecting demand from the current major cycle to the next major cycle tends to match the cyclical nature of inventory replenishment.

But splitting may be spread throughout a significant part of the interval between successive major cycles. So some splitting decisions may be made relatively near the end of an inter-cycle interval. If the bulk of the free-block-inventory replenishment occurs in major-cycle operations—and the supply of free blocks thus is naturally cyclical—it does not make sense to base such splitting decisions on criteria the same as those used when that interval is just beginning. Since the supplies of various-sized free blocks are expected to decline progressively as the time for the next major cycle draws closer, that is, one may prefer that blocks of a given size not be judged to be undersupplied just because, as expected, their number has declined during that interval to a value less than the demand projected for the entire interval. It may therefore be desirable to reassess demand at various times during the inter-major-cycle interval. For example, since minor cycles may occur, say, hundreds of times as frequently as major cycles, such a reassessment could be performed at the end of every minor garbage-collection cycle.

The reassessment can consist simply of prorating the previously projected major-cycle demand over the remaining fraction of the inter-major-cycle interval. That fraction is readily determined from the normal number of minor cycles between major cycles and the number of minor cycles that have occurred since the last major cycle. The allocator can base splitting decisions on such prorated values. If the number of given-sized free blocks exceeds the prorated demand, for example, the allocator can decide to split blocks of that size even if there are fewer such blocks than an entire inter-major-cycle interval requires.

Now, background preemptive splitting may have a cost, although it is ordinarily less than that of reactive splitting. To minimize that cost, an alternative minor-cycle-projection approach may be not to call for any background splitting of given-sized blocks unless not even enough smaller-sized free blocks remain to meet (typically, some multiple of) the demand projected for the next minor cycle alone.

Although, as was just mentioned, the minor-cycle demand may be estimated by simply computing an appropriate fraction of the major-cycle demand projected from allocation monitoring performed during one or more intervals between previous major cycles, it may instead be updated in accordance with monitoring that has been performed so far during the current inter-major-cycle interval. When a given minor cycle's promotions—and thus allocations—have been completed, the allocator can use the numbers of such allocations, alone or in (possibly weighted) averages of the numbers of previous minor cycles' allocations, to project the numbers of allocations required for the next minor cycle.

To provide a safety margin, the demand criterion will often be that the number of free blocks should equal or exceed not just the expected demand but rather some multiple of it. The just-described use of minor cycles rather than major cycles to define some demand periods can make it less expensive to provide such safety margins. To see this, first consider a safety margin based on an inter-major-cycle interval. Assume that the coalescing that precedes a given major cycle's preemptive splitting is based on demand and that the criterion used for this purpose is that the number of free blocks should exceed 130% of the demand projected over the next inter-major-cycle interval. Although the cost of this safety margin may be considered justified by the potential savings it can afford in reactive coalescing or splitting during the next inter-major-cycle interval, it still results, on average, in a 30%-greater-than-necessary memory requirement.

In contrast, consider instead using, say, only 90% of the inter-major-cycle demand as the criterion for major-cycle coalescing but using something like 200% of the projected minor-cycle demand as the threshold for deciding whether to call for background splitting at the end of each minor cycle. Since the percentage is 200% rather than 130%, this approach may be more conservative even though the percentage variation in minor-cycle demand will likely be greater than that in major-cycle demand. Since the minor-cycle demand is only, say, 0.005 of the major-cycle demand, the excess-memory cost exacted by the safety margin is only (200%×0.005)/(130%×1)=0.008 as much as in the former case. So there may be significant advantages to using demand values based on minor cycles, and such a method of projecting demand may well be employed in many of the present invention's embodiments.

Actually, the frequency with which demand projections are updated can be as high or low as desired, and the precise demand metric may differ between embodiments. Rather than base updates on minor (or major) cycles, for example, one could update that projection for each block size whenever a certain number of bytes have been allocated since the last update. For instance, one may employ a demand projection that, for a given block size, results from a demand calculation such as the following:

$$d_n = \begin{cases} a_1, & n = 1 \\ d_{n-1}r + a_n(1-r), & n \geq 2, \end{cases} \quad (1)$$

where $d_n$ is the nth demand projection for the given memory-block size, $a_n$ is the number of blocks of the given size that have been allocated since the (n−1)th update, and $0 \leq r \leq 1$ is a decay parameter. Equation (1) shows that the demand projections when r=0 and r=1 are respectively the most-recent and the first allocation counts, whereas the following expansion of Equation (1) for r>0 shows that the projected demand for all other values of r depends on all periods' allocation counts but responds more quickly to allocation-count changes when r is close to zero than when it is close to one:

$$d_n = \begin{cases} a_1, & n = 1 \\ a_1 r^{n-1} + (1-r)\sum_{k=2}^{n} a_k r^{n-k}, & n \geq 2. \end{cases} \quad (2)$$

FIG. 5's preemptive splitting is described as based on demand criteria that result from run-time monitoring of the program that the allocator supports. And the splitting decision is based in each case on whether the block to be split is of a size that is oversupplied and on whether either resultant block will be of a size that is undersupplied. Moreover, the supply criterion is established as a result of run-time demand monitoring.

While we prefer this approach, other embodiments may make splitting decisions differently. Demand-based decisions may instead be based solely on the undersupply of one or both resultant blocks' sizes, on some combination of that oversupply with the undersupply of blocks whose size is that of the block to be split, or on some comparison, such as between the degree of oversupply and the degree of undersupply. Also, the demand value used in making the decision may be predetermined rather than based on run-time monitoring. Or the decisions may be based, say, on some type of alternating between "on time" and "off time" for different sizes: splitting may depend on whether the sizes of the block to be split and/or one or both of the resultant blocks are currently in their on times or their off times.

The criterion used to determine whether to split a block may enforce policies in addition to a demand policy. One such policy is that the allocator keep a large block of contiguous free memory at one or the other end of the heap, typically at the high-address, "right" end. To add this policy to the demand criterion, the list-size-to-projected-demand ratio that must be exceeded if splitting is to occur can be made greater for higher addresses than for lower addresses, for instance, or smaller for high address differences between the block to be coalesced and the large terminal block than for lower differences. Other factors may also enter into the demand criterion. In an object-oriented program, for instance, the criterion can be varied in accordance with the class of the object that previously occupied the newly freed memory block. For some programs, even factors such as the time of day may be useful contributors to determining what the criterion should be.

The present invention can thus be implemented in a wide range of embodiments and therefore constitutes a significant advance in the art.

What is claimed is:

1. For satisfying requests for dynamic allocation of blocks of a computer system's computer memory, a method that includes:
   A) maintaining an inventory of memory blocks available for dynamic allocation;
   B) providing a demand indicator for each of a plurality of size ranges;
   C) in response to release requests that specify respective memory blocks, adding those memory blocks to the inventory;
   D) for each of at least some memory blocks in the inventory:
      i) making a splitting decision for that memory block that depends on the value of the demand indicator associated with the size range to which the size of that memory block belongs and on the number of inventory memory blocks that are in that size range; and ii) splitting that memory block into split-result memory blocks only upon a positive outcome of the splitting decision made for that block; and E) allocating split-result memory blocks in response to at least some allocation requests.

2. A method as defined in claim 1 further including deriving the demand indicator for each size range by monitoring run-time allocations of memory blocks whose sizes belong to that range.

3. A method as defined in claim 2 wherein run time is treated as divided into periods, and the demand indicator employed during one period depends on the allocations that occur during the immediately previous period.

4. A method as defined in claim 3 wherein the demand indicator employed during one period additionally depends on the allocations that occur before the immediately previous period.

5. A method as defined in claim 3 wherein at least some of the release requests are made by a garbage collector that operates in garbage-collection cycles, and the periods into which the run time is decided are garbage-collection cycles in which the garbage collector operates.

6. A method as defined in claim 2 wherein, for at least one of said size ranges, the derivation of the demand indicator includes determining a difference value equal to the difference between the number of free blocks whose sizes belong to that range at one time and the number of free blocks whose sizes belong to that range at some other time.

7. A method as defined in claim 6 wherein, for at least one of said size ranges, the derivation of the demand indicator includes adjusting the difference value for the numbers of free blocks added and removed from the inventory by coalescing and splitting.

8. A method as defined in claim 2 wherein the only demand indicator on whose value the splitting decision depends is the demand indicator associated with the size range to which the size of the memory block for which the splitting decision is being made belongs.

9. A method as defined in claim 2 wherein each of a plurality of the size ranges includes only one block size.

10. A method as defined in claim 1 wherein each of a plurality of the size ranges includes only one block size.

11. A storage medium containing instructions readable, by a computer system that makes allocation requests and includes computer memory, to configure the computer system to operate as an allocator that:

A) maintains an inventory of memory blocks available for dynamic allocation;

B) provides a demand indicator for each of a plurality of size ranges;

C) in response to release requests that specify respective memory blocks, adds those memory blocks to the inventory, D) for each of at least some memory blocks in the inventory:
 i) makes a splitting decision for that memory block that depends on the value of the demand indicator associated with the size range to which the size of that memory block belongs and on the number of inventory memory blocks that are in that size range; and
 ii) splits that memory block into split-result memory blocks only upon a positive outcome of the splitting decision made for that block; and E) allocates split-result memory blocks in response to at least some allocation requests.

12. A storage medium as defined in claim 11 wherein the allocator derives the demand indicator for each size range by monitoring run-time allocations of memory blocks whose sizes belong to that range.

13. A storage medium as defined in claim 12 wherein run time is treated as divided into periods, and the demand indicator employed during one period depends on the allocations that occur during the immediately previous period.

14. A storage medium as defined in claim 13 wherein the demand indicator employed during one period additionally depends on the allocations that occur before the immediately previous period.

15. A storage medium as defined in claim 13 wherein at least some of the release requests are made by a garbage collector that operates in garbage-collection cycles, and the periods into which the run time is decided are garbage-collection cycles in which the garbage collector operates.

16. A storage medium as defined in claim 12 wherein, for at least one of said size ranges, the derivation of the demand indicator includes determining a difference value equal to the difference between the number of free blocks whose sizes belong to that range at one time and the number of free blocks whose sizes belong to that range at some other time.

17. A storage medium as defined in claim 16 wherein, for at least one of said size ranges, the derivation of the demand indicator includes adjusting the difference value for the numbers of free blocks added and removed from the inventory by coalescing and splitting.

18. A storage medium as defined in claim 12 wherein the only demand indicator on whose value the splitting decision depends is the demand indicator associated with the size range to which the size of the memory block for which the splitting decision is being made belongs.

19. A storage medium as defined in claim 12 wherein each of a plurality of size ranges includes only one block size.

20. A storage medium as defined in claim 11 wherein each of a plurality of the size ranges includes only one block size.

21. A computer system that makes allocation requests, includes computer memory, and includes:

A) memory locations, included in the computer memory, that contain instructions directing the computer system to maintain an inventory of memory blocks available for dynamic allocation;

B) memory locations, included in the computer memory, that contain instructions directing the computer system to derive, for each of a plurality of size ranges, a demand indicator by monitoring run-time allocations of memory blocks whose sizes belong to that range;

C) memory locations, included in the computer memory, that contain instructions directing the computer system to respond to release requests that specify respective memory blocks by adding those memory blocks to the inventory;

D) memory locations, included in the computer memory, that contain instructions directing the computer system, for each of at least some memory blocks in the inventory, to:
 i) make a splitting decision for that memory block that depends on the value of the demand indicator associated with the size range to which the size of that memory block belongs and on the number of inventory memory blocks that are in that size range; and
 ii) split that memory block into split result memory blocks only upon a positive outcome of the splitting decision made for that block; and E) memory locations, included in the computer memory, that contain instructions directing the computer system to allocate split-result memory blocks in response to at least some allocation requests.

22. A computer system as defined in claim 21 further including deriving the demand indicator for each size range by monitoring run-time allocations of memory blocks whose sizes belong to that range.

23. A computer system as defined in claim 22 wherein run time is treated as divided into periods, and the demand indicator employed during one period depends on the allocations that occur during the immediately previous period.

24. A computer system as defined in claim 23 wherein the demand indicator employed during one period additionally depends on the allocations that occur before the immediately previous period.

25. A computer system as defined in claim 23 wherein at least some of the release requests are made by a garbage collector that operates in garbage-collection cycles, and the periods into which the run time is decided are garbage-collection cycles in which the garbage collector operates.

26. A computer system as defined in claim 22 wherein, for at least one of said size ranges, the derivation of the demand indicator includes determining a difference value equal to the difference between the number of free blocks whose sizes belong to that range at one time and the number of free blocks whose sizes belong to that range at some other time.

27. A computer system as defined in claim 26 wherein, for at least one of said size ranges, the derivation of the demand indicator includes adjusting the difference value for the numbers of free blocks added and removed from the inventory by coalescing and splitting.

28. A computer system as defined in claim 22 wherein the only demand indicator on whose value the splitting decision depends is the demand indicator associated with the size range to which the size of the memory block for which the splitting decision is being made belongs.

29. A computer system as defined in claim 22 wherein each of a plurality of the size ranges includes only one block size.

30. A computer system as defined in claim 21 wherein each of a plurality of the size ranges includes only one block size.

31. A computer system that makes allocation requests and includes:
  A) means for maintaining an inventory of memory blocks available for dynamic allocation;
  B) means for deriving a demand indicator for each of a plurality of size ranges;
  C) means for responding to release requests that specify respective memory blocks by adding those memory blocks to the inventory;
  D) for each of at least some memory blocks in the inventory, means for:
    i) making a splitting decision for that memory block that depends on the value of the demand indicator associated with the size range to which the size of that memory block belongs and on the number of inventory memory blocks that are in that size range; and
    ii) splitting that memory block into split-result memory blocks only upon a positive outcome of the splitting decision made for that block; and
  E) means for splitting split-result memory blocks in response to at least some allocation requests.

32. A computer system as defined in claim 31 wherein the means for providing a demand indicator for each of a plurality of size ranges derives the demand indicator for each size range by monitoring run-time allocations of memory blocks whose sizes belong to that range.

33. A computer signal representing sequences of instructions that, when executed by a computer system that makes allocation requests and includes computer memory, cause it to operate as an allocator that:
  A) maintains an inventory of memory blocks available for dynamic allocation;
  B) for each of a plurality of size ranges, derives a demand indicator by monitoring run-time allocations of memory blocks whose sizes belong to that range;
  C) in response to release requests that specify respective memory blocks, adds those memory blocks to the inventory;
  D) for each of at least some memory blocks in the inventory:
    i) makes a splitting decision for that memory block that depends on the value of the demand indicator associated with the size range to which the size of that memory block belongs and on the number of inventory memory blocks that are in that size range; and
    ii) splits that memory block into split-result memory blocks only upon a positive outcome of the splitting decision made for that block; and
  E) allocates split-result memory blocks in response to at least some allocation requests.

34. A computer signal as defined in claim 33 wherein the allocator derives the demand indicator for each size range by monitoring run-time allocations of memory blocks whose sizes belong to that range.

35. A computer signal as defined in claim 34 wherein run time is treated as divided into periods, and the demand indicator employed during one period depends on the allocations that occur during the immediately previous period.

36. A computer signal as defined in claim 35 wherein the demand indicator employed during one period additionally depends on the allocations that occur before the immediately previous period.

37. A computer signal as defined in claim 35 wherein at least some of the release requests are made by a garbage collector that operates in garbage-collection cycles, and the periods into which the run time is decided are garbage-collection cycles in which the garbage collector operates.

38. A computer signal as defined in claim 34 wherein, for at least one of said size ranges, the derivation of the demand indicator includes determining a difference value equal to the difference between the number of free blocks whose sizes belong to that range at one time and the number of free blocks whose sizes belong to that range at some other time.

39. A computer signal as defined in claim 38 wherein, for at least one of said size ranges, the derivation of the demand indicator includes adjusting the difference value for the numbers of free blocks added and removed from the inventory by coalescing and splitting.

40. A computer signal as defined in claim 34 wherein the only demand indicator on whose value the splitting decision depends is the demand indicator associated with the size range to which the size of the memory block for which the splitting decision is being made belongs.

41. A computer signal as defined in claim 34 wherein each of a plurality of the size ranges includes, only one block size.

42. A computer signal as defined in claim 33 wherein each of a plurality of the size ranges includes only one block size.

* * * * *